C. McNEIL.
SUGAR CANE MILL.
APPLICATION FILED MAY 5, 1920.
1,365,521.
Patented Jan. 11, 1921.
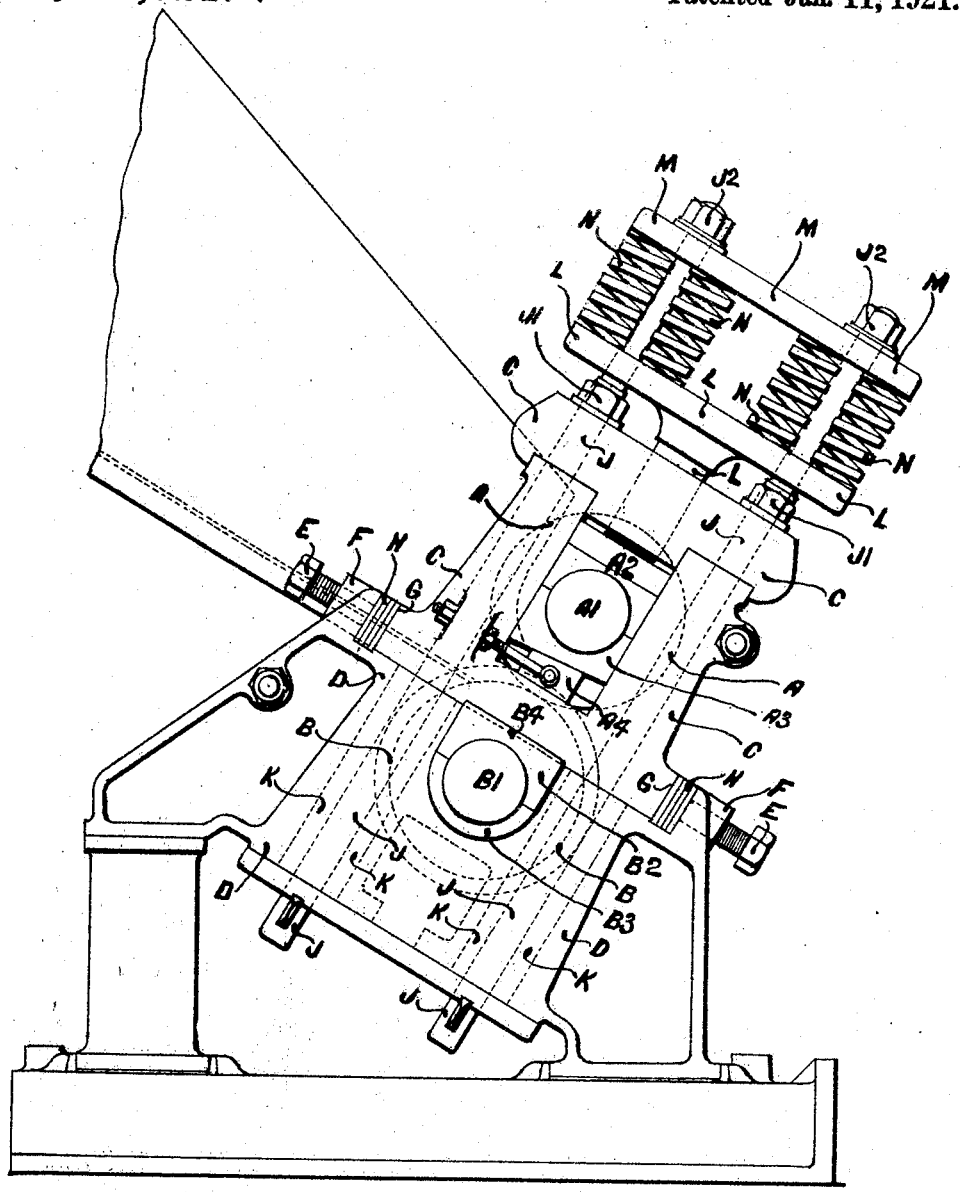
INVENTOR
CHARLES McNEIL
BY Howson and Howson
ATTORNEYS

UNITED STATES PATENT OFFICE.

CHARLES McNEIL, OF GOVAN, SCOTLAND.

SUGAR-CANE MILL.

1,365,521.　　　　Specification of Letters Patent.　　Patented Jan. 11, 1921.

Application filed May 5, 1920.　Serial No. 379,059.

*To all whom it may concern:*

Be it known that I, CHARLES MCNEIL, B. Sc., a subject of the King of Great Britain and Ireland, and a resident of Govan, in the city and county of Glasgow, Scotland, have invented certain new and useful Improvements in Connection with Sugar-Cane Mills, of which the following is the specification.

The invention relates to sugar-cane mills more particularly those having two rollers, one superposed upon the other, but is also applicable under some conditions to mills having more than two rollers; and has for its object to provide ready means for adjusting the position of the upper roll to the lower roll in a plane substantially normal to that in which lie the axes of the rolls.

According to the invention, and as applied to the upper roll of a two-roll mill, the housings of the upper roll are made separate from and are carried upon the upper parts of the housing of the lower roll. The abutting parts of the upper and lower housings are in the form of coacting guide surfaces in a plane substantially normal to the plane in which lie the axes of the rolls, and means are provided for adjusting the upper housings laterally upon the lower housings. For example, set pins bearing upon the ends of the bottom faces of the lower housing and mounted in lugs upstanding from the ends of the upper housing may be used in conjunction with packing pieces inserted between the lugs and faces.

The bearings of the upper housing are held down by king bolts of usual type which also serve to hold the upper and lower housings in position. In order to accommodate the lateral adjustment of the upper housing, clearances are provided in the lower housing to permit of the movement of the king bolts.

Pressure may be applied to the upper roll in any convenient manner.

An illustrative example of the carrying out of the invention as applied to a two-roll mill is shown in outside elevation on an accompanying sheet of explanatory drawings. In this example there are provided an upper roll A mounted on a shaft $A^1$ carried in bearing blocks $A^2$, $A^3$, and a lower roll B mounted on a shaft $B^1$ carried in bearing blocks $B^2$, $B^3$, the blocks being located in housings C and D respectively. The upper and lower housings abut each other in a plane substantially normal to that containing the axes of the rolls, the upper housing C being capable of adjustment in this plane across the face of the lower housing D and in a direction at right angles to the axes of the rolls. This adjustment is effected by means of set screws E, carried in lugs F on opposite sides of the lower housing D, and bearing on packing pieces H inserted between the inner faces of the lugs F and adjacent faces G formed on the lower part of the upper housing. The packing pieces H are in the nature of comparatively thin strips of metal extending across the whole length of the housings. The pressure of the screws E is exerted across a plane parallel to the plane of abutment of the housings.

In order to guide the upper housing while under adjustment and to prevent axial movement thereof, the upper bearing block $B^2$ of the lower roll B is provided at both ends with an upstanding ledge $B^4$ which abuts, and acts as a guide surface for the adjacent end face of the upper housing.

The upper housing C is held hard down on the lower housing D by king bolts J and nuts $J^1$, the latter being slackened when it is desired to adjust the lateral position of the upper housing by the set screws E. To allow for this lateral adjustment, clearances K are provided in the lower housing D, which permit of the necessary movement of the king bolts J. The king bolts project beyond the nuts $J^1$ through apertures in a press head L and yoke M, and are there secured by nuts $J^2$ abutting the upper surface of the latter. The press head L bears upon the upper surface of the bearing block $A^2$. Pressure is applied to the upper roll by means of springs N arranged in compression around each king bolt J and between the inner faces of the press head and yoke. The lower bearing block $A^3$ of the upper roll is positioned by a wedge $A^4$ in usual manner.

What I claim is:—

1. In sugar-cane mills of the type referred to, having an upper roll superimposed upon a lower one; means for adjusting the relative position of the upper roll in a plane substantially normal to that containing the axes of the rolls, said means rendering it possible to adjust the upper roll in a direction at right angles to the axes of the rolls; as set forth.

2. In the mechanism forming the subject-matter of the foregoing claim hereof; a housing for the upper roll abutting a housing for the lower roll in a plane substantially normal to the axes of the rolls; coacting guide surfaces on the abutting parts of the housings; lugs on opposite sides of the lower housing, set screws located in said lugs and packing pieces inserted between the inner faces of the lugs and adjacent faces formed on the lower part of the upper housing; and against which packing pieces the set screws bear; as set forth.

3. In the mechanism forming the subject-matter of claim 2 hereof; an upper bearing block for the shaft of the lower roll, provided at both ends with an upstanding ledge which abuts and acts as a guide surface for the adjacent end face of the upper housing; as and for the purposes set forth.

4. In sugar cane mills of the type referred to, having an upper roller superposed upon a lower one, independent housings for the upper and lower rolls respectively, and means for adjusting said housings transversely to the plane in which the roll axes lie, together with means for securing the same together in adjusted position.

In testimony whereof I have signed my name to this specification.

CHARLES McNEIL.